(12) United States Patent
Ito

(10) Patent No.: US 12,348,686 B2
(45) Date of Patent: Jul. 1, 2025

(54) IMAGE PROCESSING APPARATUS AND SYSTEM FOR MEETING MANAGEMENT

(71) Applicant: CANON KABUSHIKI KAISHA, Tokyo (JP)

(72) Inventor: Chie Ito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/159,386

(22) Filed: Jan. 25, 2023

(65) Prior Publication Data
US 2023/0247147 A1   Aug. 3, 2023

(30) Foreign Application Priority Data
Jan. 31, 2022   (JP) ................. 2022-012594

(51) Int. Cl.
*H04N 1/00* (2006.01)

(52) U.S. Cl.
CPC ..... *H04N 1/00114* (2013.01); *H04N 1/00129* (2013.01)

(58) Field of Classification Search
CPC ........... H04N 1/00114; H04N 1/00129; H04N 1/00095; H04N 1/00209; H04N 1/00228
USPC ................. 358/504, 401
See application file for complete search history.

(56) References Cited

U.S. PATENT DOCUMENTS

| | | | |
|---|---|---|---|
| 2015/0026552 A1* | 1/2015 | Horie | G06F 40/169 715/211 |
| 2015/0077369 A1* | 3/2015 | Nagahara | G09G 5/003 345/173 |
| 2017/0054874 A1* | 2/2017 | Oe | H04B 1/3833 |
| 2018/0324310 A1* | 11/2018 | Hashimoto | H04N 1/00334 |
| 2021/0027750 A1* | 1/2021 | Kokubo | G06F 3/1462 |

FOREIGN PATENT DOCUMENTS

JP    2017028645 A    2/2017

* cited by examiner

*Primary Examiner* — Kent Yip
(74) *Attorney, Agent, or Firm* — Canon U.S.A., Inc., IP Division

(57) ABSTRACT

An image processing apparatus includes a scan unit that scans an image of a document and generates image data, a reception unit that receives information for identifying a whiteboard of a whiteboard function provided by an information processing apparatus, a processor that determines position information for indicating a position on the identified whiteboard where the generated image data is to be inserted, and a transmission unit that transmits the generated image data, the received information for identifying the whiteboard, and the position information to the information processing apparatus.

19 Claims, 16 Drawing Sheets

FIG.10A

| ← | TRANSMISSION DESTINATION (MEETING IN PROGRESS) | LOG OUT |

1001

☐ NEW FUNCTION CONSIDERATION (15:00 ~ 17:00)    >

1002

EXECUTE TRANSMISSION

| ← | DISPLAY POSITION | LOG OUT |

☐ AUTOMATIC
☐ UPPER RIGHT
☐ LOWER RIGHT
☐ CENTER
☐ UPPER LEFT
☐ LOWER LEFT

FIG.15

| ← | TRANSMISSION DESTINATIONS (CURRENT WEEK) | LOG OUT |
|---|---|---|

☐ SECTION MEETING (TUE 9:00 – 10:00)

☐ REGULAR ELEMENT MEETING (WED 9:00 – 10:00)

☐ REGULAR PRODUCT MEETING (WED 15:00 – 16:00)

☐ REGULAR PATENT MEETING (THU 15:00 – 16:00)

IMAGE PROCESSING APPARATUS AND SYSTEM FOR MEETING MANAGEMENT

BACKGROUND

Field

The present disclosure relates to an image processing apparatus, an image processing system, and a storage medium.

Description of the Related Art

Japanese Patent Application Laid-Open No. 2017-28645 discusses an image processing apparatus that transmits image data generated by scanning a document to a meeting management apparatus so that the image data is stored in association with a predetermined meeting of a meeting application.

A whiteboard function is a function of an online meeting system. The whiteboard function is a canvas function with which a plurality of users attending an online meeting can draw diagrams and pictures on a whiteboard and share the drawn diagrams and pictures in real time. In order to display an image of image data generated by scanning on the whiteboard provided by the whiteboard function, the image data stored in advance in an apparatus attending the online meeting is selected and uploaded. This requires an extra operation. Japanese Patent Application Laid-Open No. 2017-28645 discusses the storing of image data in association with an online meeting but is silent on the displaying of an image of the image data on a whiteboard.

SUMMARY

The present disclosure is directed to reducing operations in sharing image data generated by scanning using a whiteboard function.

According to an aspect of the present disclosure, an image processing apparatus includes a scan unit configured to scan an image of a document and generate image data, a reception unit configured to receive information for identifying a whiteboard of a whiteboard function provided by an information processing apparatus, a processor configured to determine position information for indicating a position on the identified whiteboard where the generated image data is to be inserted, and a transmission unit configured to transmit the generated image data, the received information for identifying the whiteboard, and the position information to the information processing apparatus.

Further features will become apparent from the following description of exemplary embodiments with reference to the attached drawings.

BRIEF DESCRIPTION OF THE DRAWINGS

FIGS. 10A and 10B are diagrams illustrating an example of a setting screen of a scan-to-meeting application.

FIG. 15 is a diagram illustrating an example of a transmission destination screen which is displayed in a case where a scan-to-meeting application icon is selected.

DESCRIPTION OF THE EMBODIMENTS

Various exemplary embodiments of the present disclosure will be described in detail below with reference to the drawings. While a multi-function peripheral that includes a print function, a scan function, and a facsimile function will be described below as an example of an image processing apparatus according to the exemplary embodiments, the exemplary embodiments are not limited to the multi-function peripheral. Not all combinations of features according to the exemplary embodiments are always essential to a technical solution provided by the present disclosure.

Figure 1:
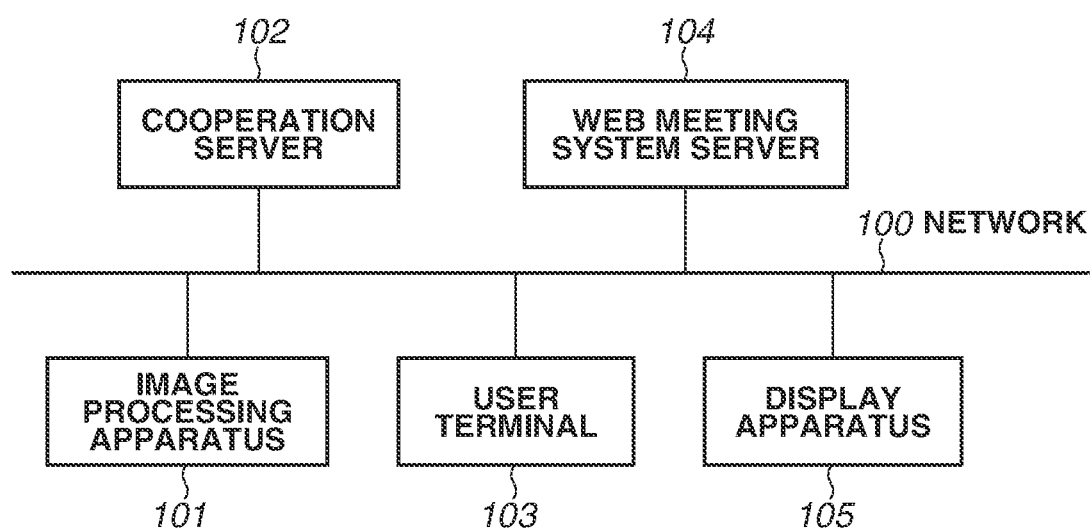
FIG. 1 is a diagram illustrating an example of a system configuration of an image processing system.

A first exemplary embodiment will now be described. FIG. 1 is a diagram illustrating an example of a system configuration of an image processing system. A cooperation server 102 is a server that manages a web meeting system server 104, an image processing apparatus 101, and a display apparatus 105, and causes the web meeting system server 104, the image processing apparatus 101, and the display apparatus 105 to cooperate with each other. The web meeting system server 104 is an information processing apparatus and is a server that provides a web meeting system. The display apparatus 105 is a liquid crystal display or a touch panel. The image processing apparatus 101, the cooperation server 102, a user terminal 103, the web meeting system server 104, and the display apparatus 105 are communicably connected together via a network 100. A plurality of image processing apparatuses (not illustrated) and/or a plurality of servers (not illustrated) can be connected.

The image processing apparatus 101 includes a function of transmitting a file including image data obtained by scanning a document image to the cooperation server 102 or the web meeting system server 104 via the network 100. The user terminal 103 logs into the cooperation server 102 to use cooperating services seamlessly.

Figure 2:
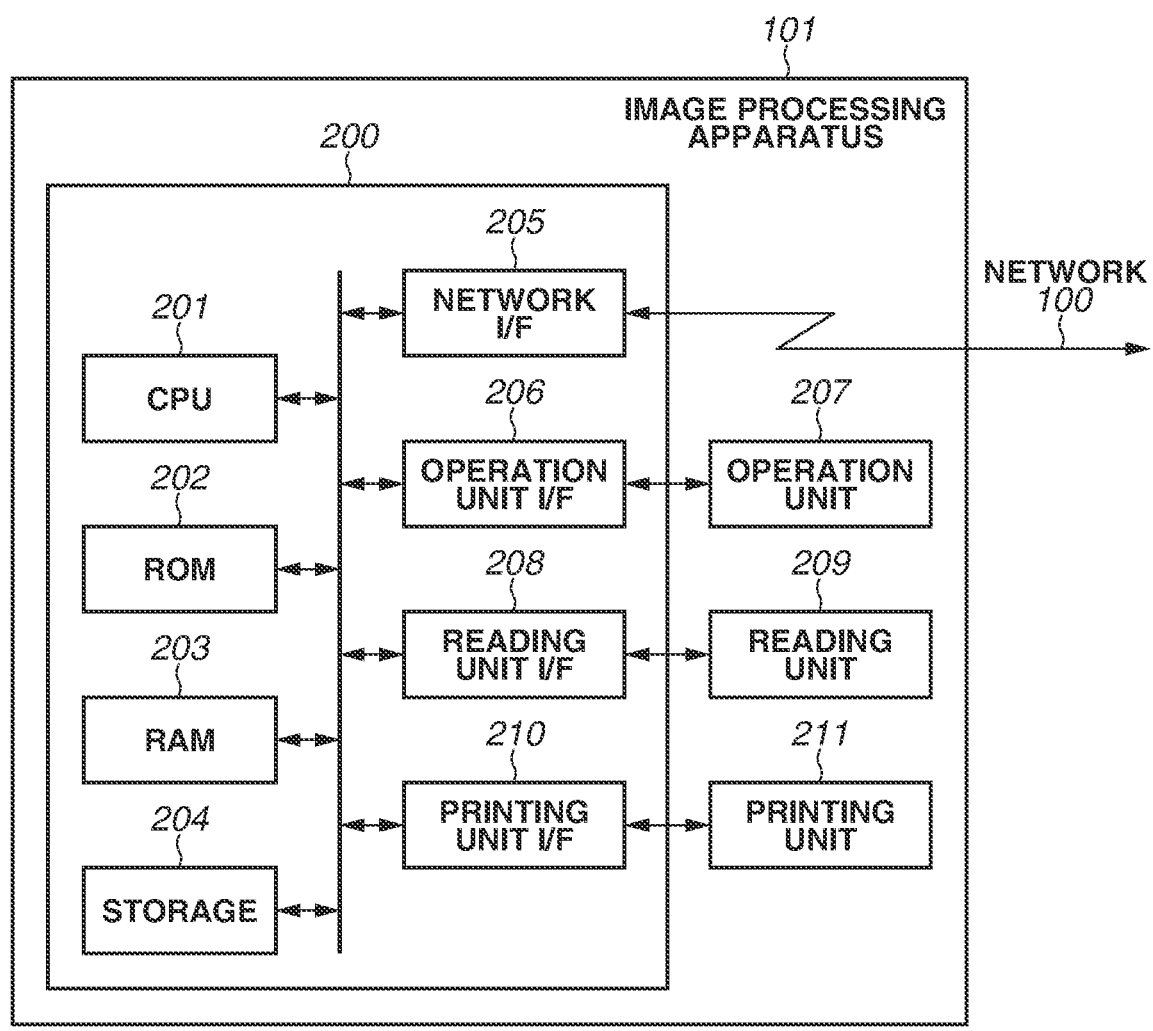
FIG. 2 is a diagram illustrating an example of a hardware configuration of an image processing apparatus.

FIG. 2 is a diagram illustrating an example of a hardware configuration of the image processing apparatus 101. The image processing apparatus 101 includes a reading function of reading an image on a sheet and a printing function of printing an image on a sheet.

The image processing apparatus 101 also includes a file transmission function of transmitting image data to an external apparatus.

While the image processing apparatus 101 is described herein as an image processing apparatus according to the present exemplary embodiment, the present exemplary embodiment is not limited to the image processing apparatus 101. For example, an image reading apparatus without a printing function, such as a scanner, can be used.

A control unit 200 including a central processing unit (CPU) 201 controls operations of the image processing apparatus 101. The CPU 201 reads control programs stored in a read-only memory (ROM) 202 or a storage 204 and performs various types of control such as reading control and printing control. The ROM 202 stores control programs that are executable by the CPU 201. A random access memory (RAM) 203 is a main storage memory of the CPU 201 and is used as a work area and a temporary storage area for loading various control programs stored in the ROM 202 and the storage 204. The storage 204 is a storage device for storing print data, image data, various programs, and various types of setting information and is, for example, a non-volatile memory such as a hard disk drive (HDD) or a solid state drive (SSD). While the image processing apparatus 101 according to the present exemplary embodiment performs various processes illustrated in sequences described below using the single CPU 201 and a single memory (RAM 203), other configurations can be used. For example, the processes illustrated in the sequences described below can be performed by a plurality of CPUs, RAMs, ROMs, and storages in cooperation with each other. Part of the processes can be performed using a hardware circuit such as an application-specific integrated circuit (ASIC) or a field-programmable gate array (FPGA).

An operation unit interface (I/F) 206 connects to an operation unit 207. The operation unit 207 is a display unit that displays information to a user and can detect user input.

A reading unit I/F 208 connects to a reading unit 209. The reading unit 209 reads an image on a sheet and generates image data. The image data generated by the reading unit 209 is transmitted to an external apparatus, or an image is printed on a sheet using the image data. The reading unit 209 can read a plurality of sheets placed on a document feeder (not illustrated) one by one while conveying the plurality of sheets singly. This enables scanning images on a plurality of document pages by a single user instruction.

A printing unit I/F 210 connects to a printing unit 211. Image data to be printed is transferred to the printing unit 211 via the printing unit I/F 210. The printing unit 211 receives a control command and image data to be printed and prints an image based on the image data on a sheet. The printing unit 211 can use a printing method such as an electrophotographic method and an inkjet method. In a case where an electrophotographic method is used, an electrostatic latent image is formed on a photosensitive member, and the formed electrostatic latent image is developed using toner. The toner image is transferred to a sheet, and the transferred toner image is fixed, whereby an image is formed. In a case where an inkjet method is used, inks are discharged to a sheet to print an image. The image processing apparatus 101 connects to the network 100 via a network I/F 205. The network I/F 205 connects to the cooperation server 102 and the user terminal 103 via the network 100 to communicate information with the cooperation server 102 and the user terminal 103 and transmits image data generated by the reading unit 209.

Print data received via the network I/F 205 is analyzed by a software module (page description language (PDL) analysis unit) (not illustrated) for analyzing print data stored in the storage 204 or the ROM 202. The PDL analysis unit generates data to be printed by the printing unit 211 based on print data described in various types of page description languages.

Figure 3:
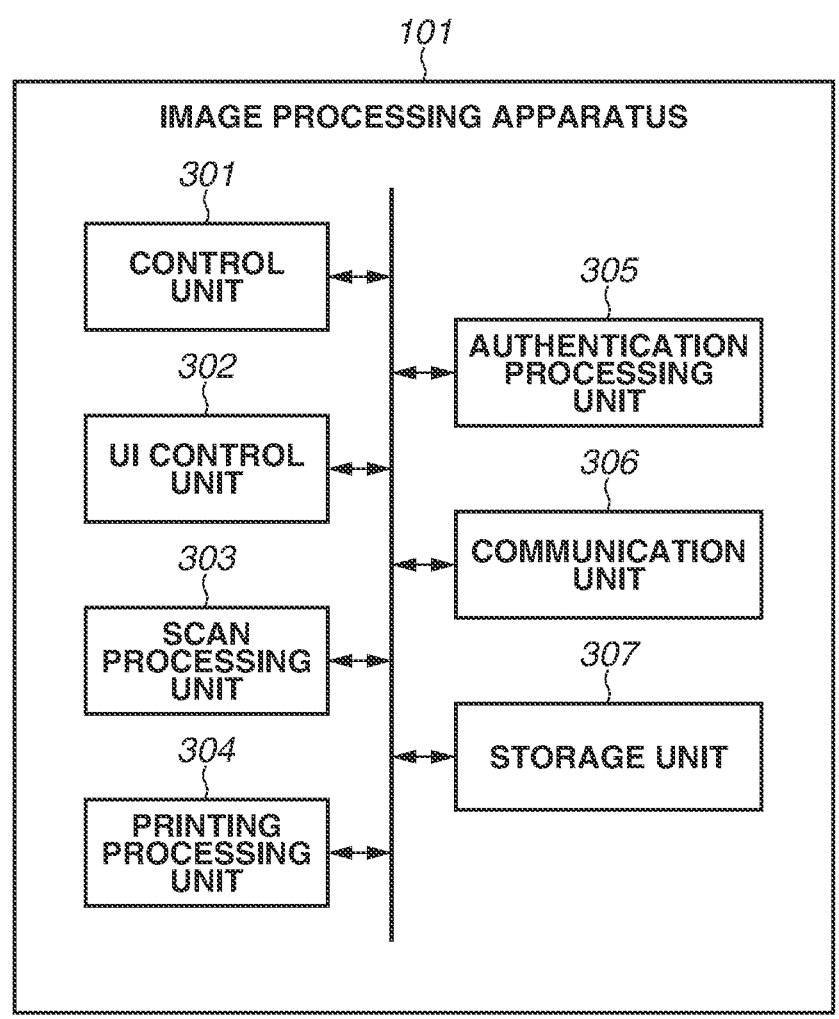
FIG. 3 is a diagram illustrating an example of a software configuration of the image processing apparatus.

FIG. 3 is a diagram illustrating an example of a software configuration of the image processing apparatus 101. A control unit 301 controls other modules and comprehensively controls performance of processing that occurs in the image processing apparatus 101, such as scan processing, transmission processing, printing processing, and display processing.

An authentication processing unit 305 receives login/logout requests from users in a case where the image processing apparatus 101 performs user management. In a case where a login request is received, the authentication processing unit 305 refers to user management information (not illustrated) stored in a storage unit 307 and performs authentication. In a case where the authentication is successful, the authentication processing unit 305 instructs a user interface (UI) control unit 302 to display a home screen. The user management information can be managed by an external server (not illustrated). In this case, the authentication processing unit 305 transmits authentication information to the external server and performs authentication.

The UI control unit 302 controls the operation unit 207 via the operation unit I/F 206. Specifically, the UI control unit 302 displays user notifications and selection items on the operation unit 207, and the UI control unit 302 receives a user operation performed on the operation unit 207 and transmits a notification of details of the operation to other functional units.

A scan processing unit 303 performs scanning using the reading unit 209 via the reading unit I/F 208 and stores read scan images in the storage unit 307.

A printing processing unit 304 performs printing using the printing unit 211 via the printing unit I/F 210.

A communication unit 306 communicates with other devices such as the cooperation server 102 and the web meeting system server 104 on the network 100 via the network I/F 205 to transmit and receive data.

The storage unit 307 stores designated data in the ROM 202, the RAM 203, or the storage 204 based on instructions from other functional units or reads stored data from the ROM 202, the RAM 203, or the storage 204 based on instructions from other functional units. According to the present exemplary embodiment, scan images read by performing scanning, user management information, and data received by the communication unit 306 are managed.

Figure 4:
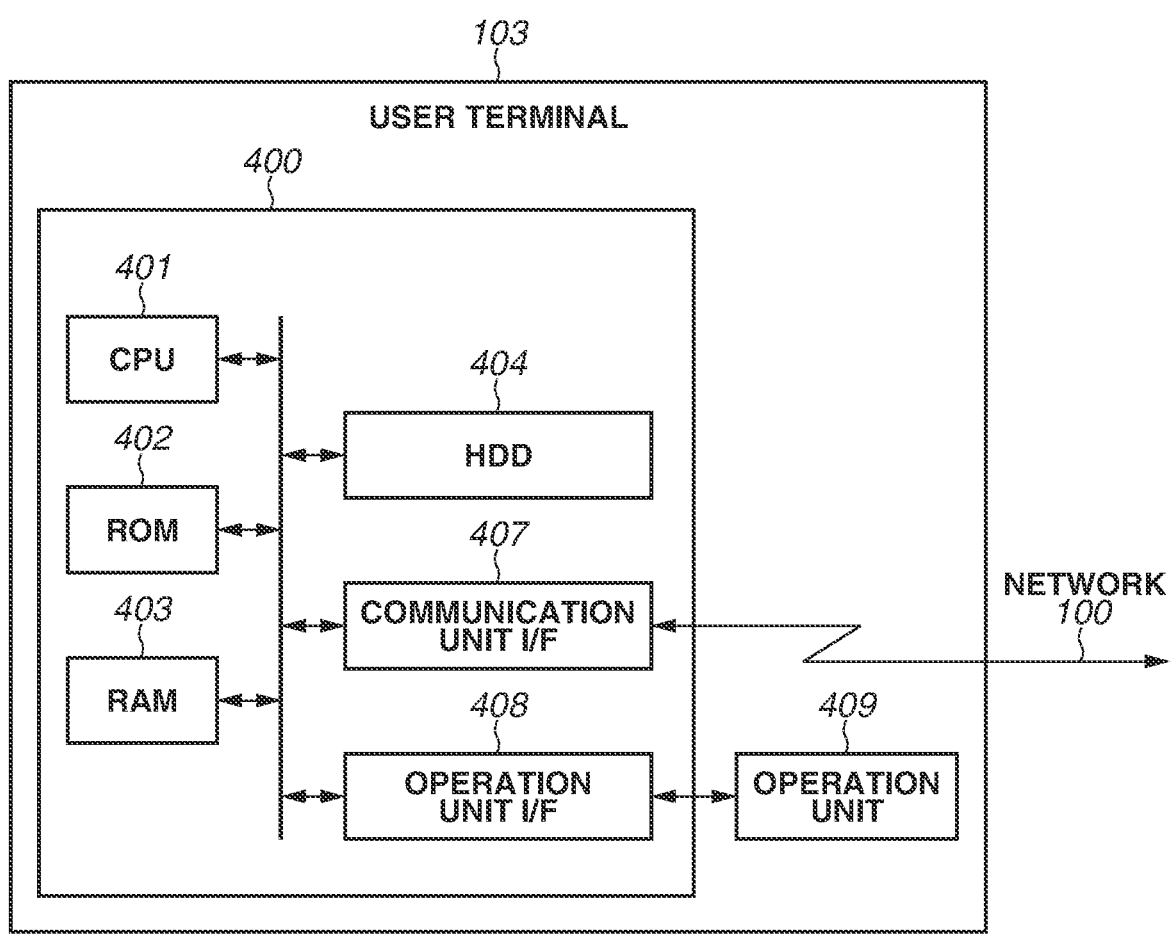
FIG. 4 is a diagram illustrating an example of a hardware configuration of a user terminal.

FIG. 4 is a diagram illustrating an example of a hardware configuration of the user terminal 103. A control unit 400 including a CPU 401 controls operations of the user terminal 103. The CPU 401 including a computation circuit reads programs stored in a ROM 402 or an HDD 404 to a RAM 403 and performs various types of processing. The ROM 402 stores system programs for use in controlling the user terminal 103. The HDD 404 includes a function as a storage area and stores application programs for performing various types of processing. The HDD 404 is an example of a storage device and the storage device can be an SSD besides an HDD. A web meeting application, a chat application, and a login service for logging into the cooperation server 102 are installed in the HDD 404 and executed by the CPU 401. A communication unit I/F 407 is an interface for connecting various devices to the user terminal 103. The communication unit I/F 407 communicates with the image processing apparatus 101 via the network 100 based on control by the CPU 401. An operation unit I/F 408 connects to an operation unit 409. The operation unit 409 displays information to a user and detects user input.

Figure 5:
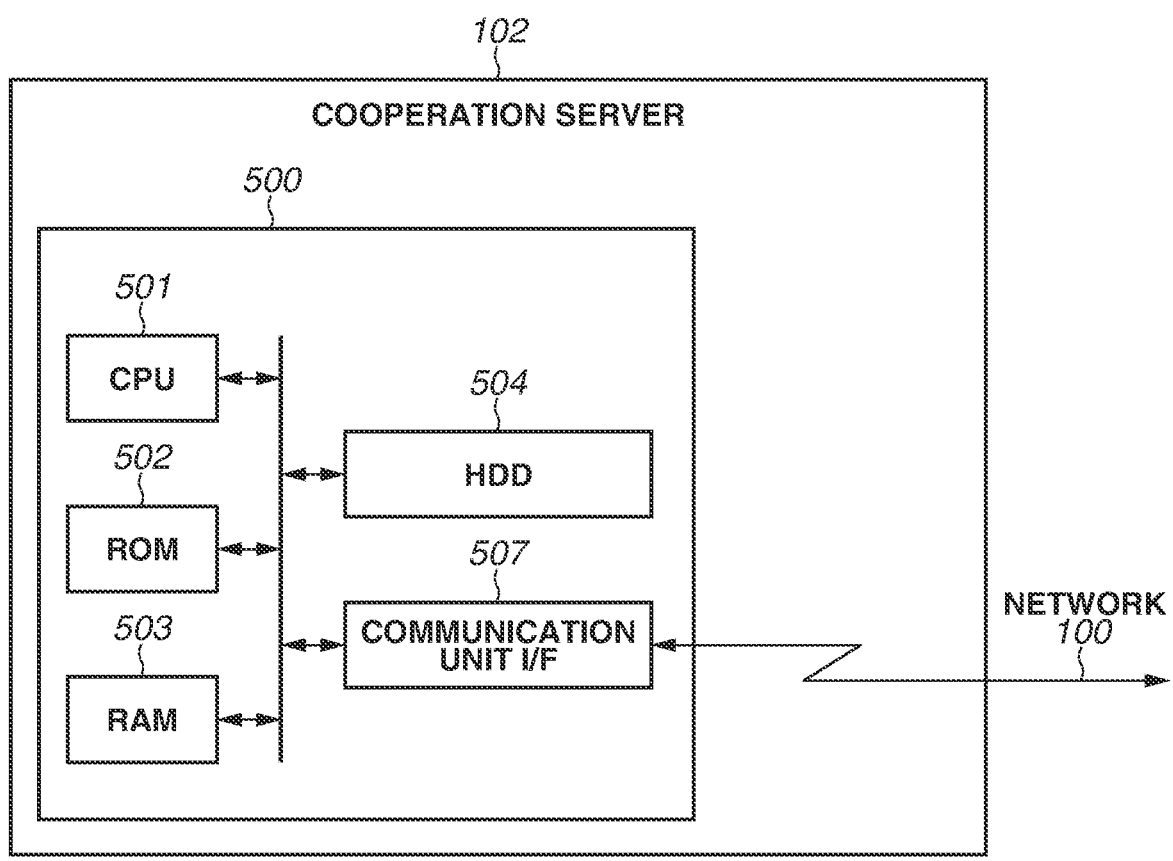
FIG. 5 is a diagram illustrating an example of a hardware configuration of a cooperation server.

FIG. 5 is a diagram illustrating an example of a hardware configuration of the cooperation server 102. A control unit 500 including a CPU 501 controls operations of the cooperation server 102. The CPU 501 including a computation circuit reads programs stored in a ROM 502 or an HDD 504 to a RAM 503 and performs various types of processing. The ROM 502 stores system programs for use in controlling the cooperation server 102. The HDD 504 includes a function as a storage area and stores application programs for performing various types of processing. The HDD 504 is an example of a storage device and the storage device can be an SSD besides an HDD. Various services are installed in the HDD 504 and executed by the CPU 501. The HDD 504 also stores user account information, the cooperating image processing apparatus (101), management information about the web meeting system server (104), and tenant information about the chat application. The tenant information can be stored in an external server (not illustrated). A communication unit I/F 507 is an interface for connecting various devices to the cooperation server 102. The communication unit I/F 507 communicates with the image processing apparatus 101 via the network 100 based on control by the CPU 501.

Figure 6:
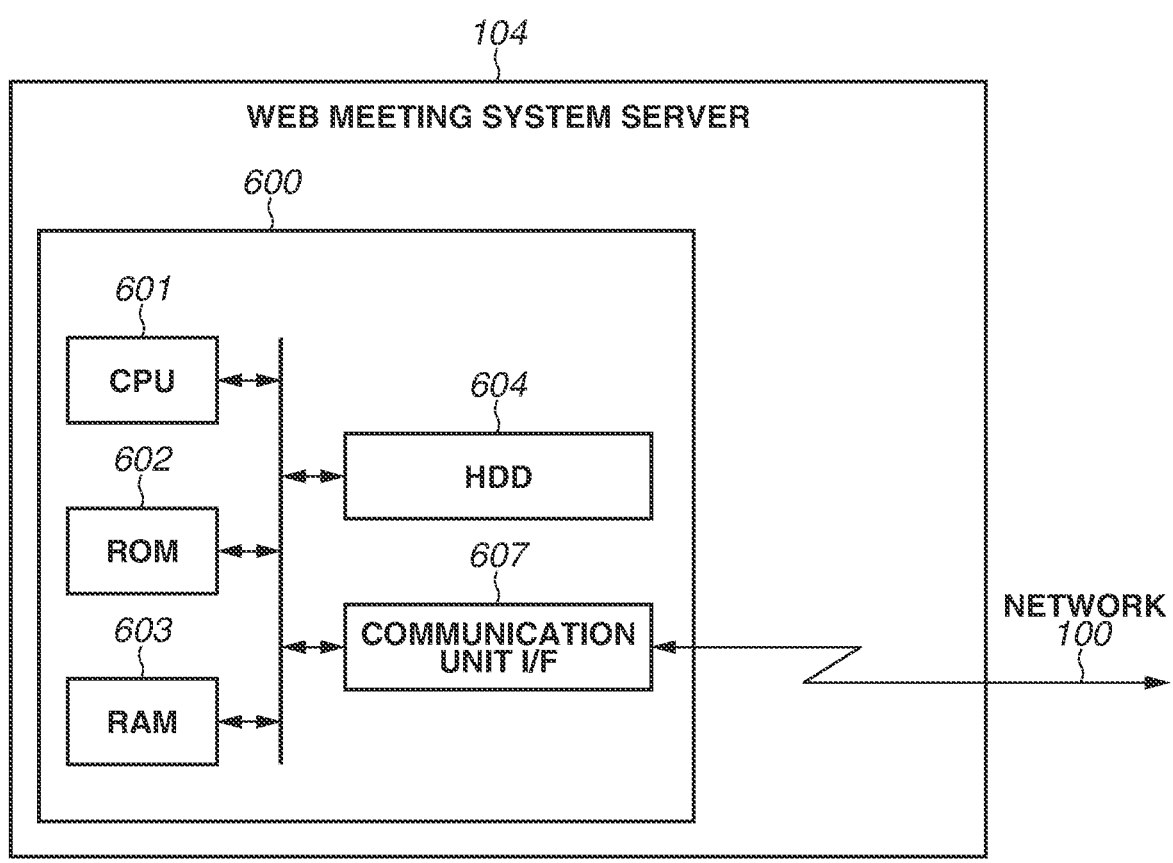
FIG. 6 is a diagram illustrating an example of a hardware configuration of a web meeting system server.

FIG. 6 is a diagram illustrating an example of a hardware configuration of the web meeting system server 104. A control unit 600 including a CPU 601 controls operations of the web meeting system server 104. The CPU 601 including a computation circuit reads programs stored in a ROM 602 or an HDD 604 to a RAM 603 and performs various types of processing. The ROM 602 stores system programs for use in controlling the web meeting system server 104. The HDD 604 includes a function as a storage area and stores application programs for performing various types of processing. The HDD 604 is an example of a storage device and the storage device can be an SSD besides an HDD. Various services and applications that relate to web meetings are installed in the HDD 604 and executed by the CPU 601. A communication unit I/F 607 is an interface for connecting various devices to the web meeting system server 104. The communication unit I/F 607 communicates with the image processing apparatus 101 via the network 100 based on control by the CPU 601.

Figure 7A:
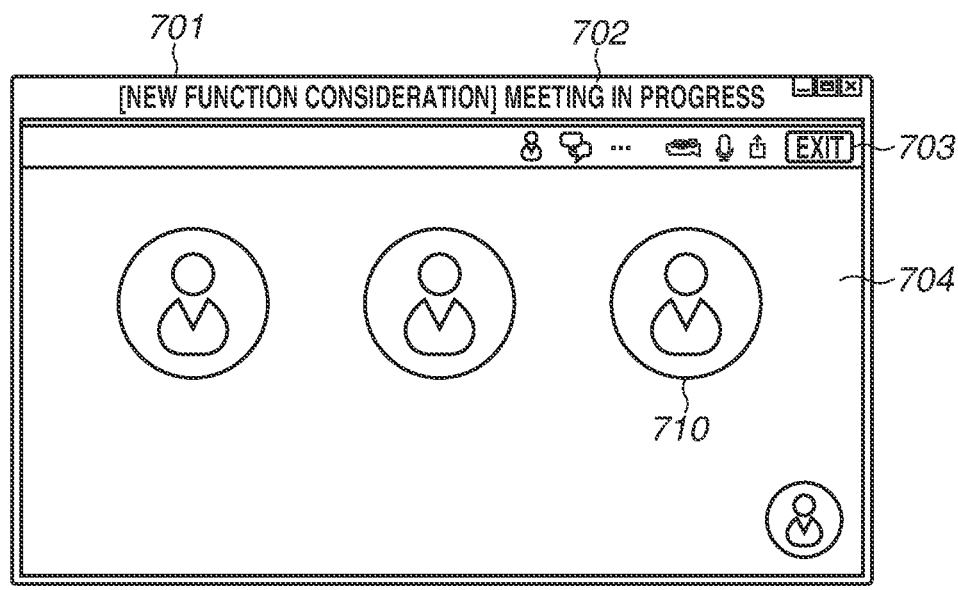
FIGS. 7A, 7B, and 7C are diagrams illustrating an example of a screen that is displayed by executing a web meeting application.
Figure 7B:
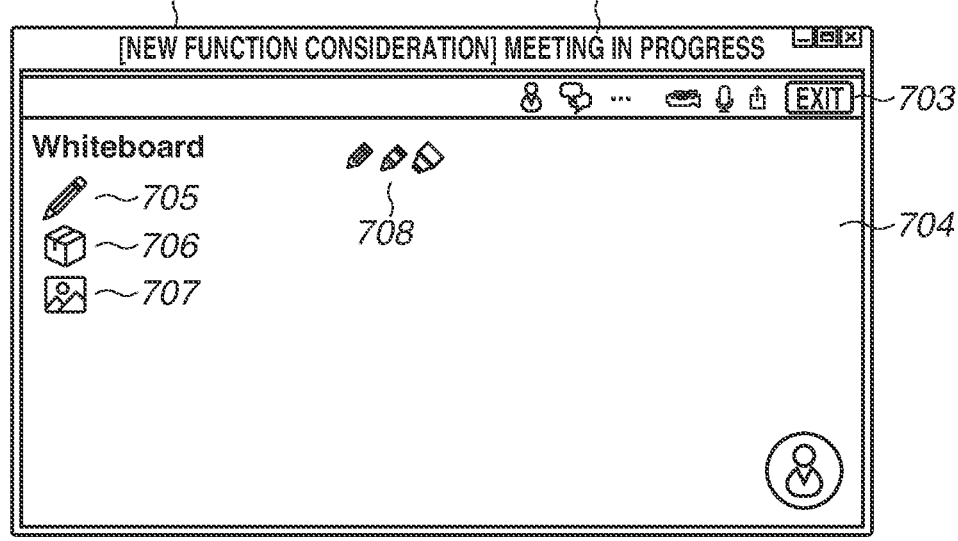
Figure 7C:
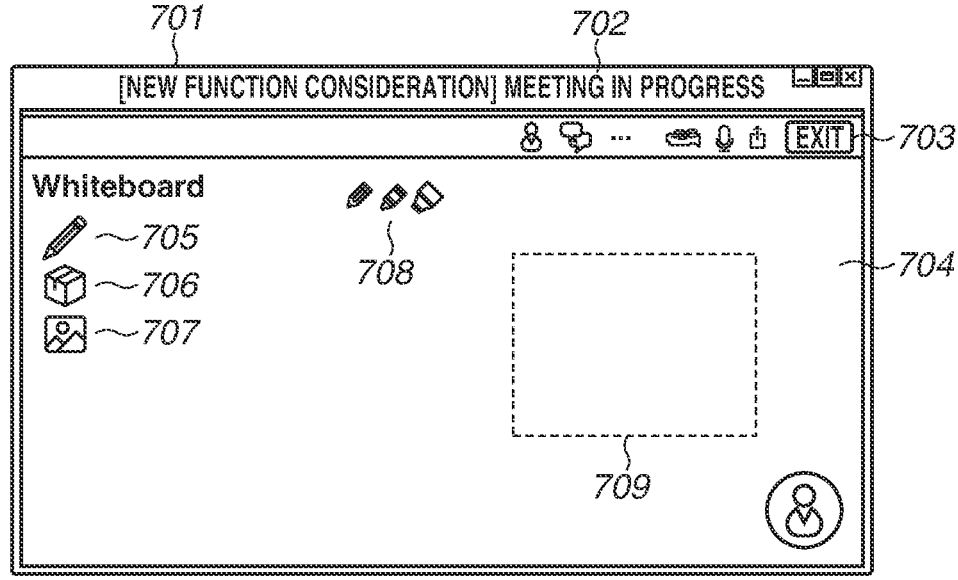

FIGS. 7A to 7C are diagrams illustrating an example of a screen that is displayed by executing the web meeting application. The screens in FIGS. 7A to 7C are screens that are displayed on the operation unit 409 of the user terminal 103 in a case where the user terminal 103 communicates with the web meeting system server 104 and receives various types of information.

FIG. 7A illustrates an example of a screen of a web meeting application 701 operating on the user terminal 103. A user logs in to a cooperation service operating on the cooperation server 102 via a cooperation service login application operating on the user terminal 103. After logging in, the user accesses the web meeting system operating on the web meeting system server 104 from the web meeting application 701 and attends a web meeting.

On a screen displayed by the web meeting application 701, a name 702 of the meeting that the user currently attends, an exit button 703 for exiting the meeting, an icon for switching audio input, and an icon for switching video input are arranged. In a case where the screen and/or the application are not shared, an icon 710 indicating an attendee of the meeting is displayed on a display view 704.

FIG. 7B illustrates an example of a screen in a case where a whiteboard function is activated on the web meeting application 701. The display view 704 displays a screen of the whiteboard function, and various menu buttons such as a text insertion button 705, a shape insertion button 706, and an image insertion button 707 are arranged on a whiteboard. An icon 708 for selecting a style of a line to be input freehand is also arranged.

Each user attending the meeting can input text using a keyboard, draw objects freehand such as characters and pictures, and insert image data on the whiteboard. For example, in a case where a user inserts image data or draws a character or a picture, the image data or the character or the picture is similarly displayed on whiteboards displayed on other user terminals. Specifically, the whiteboard function is a function of sharing inserted information substantially simultaneously with a plurality of users operating a plurality of terminals connected to the web meeting system server 104. This enables image data, characters, and pictures to be shared in real time.

FIG. 7C illustrates an example of a screen in selecting the image insertion button 707 of a whiteboard application and inserting an image.

A user selects the image insertion button 707 and selects image data stored in the HDD 404 of the user terminal 103. The user selects an insertion position on the whiteboard, inserts an image, and then changes a size. Consequently, the image of the designated size is displayed at the designated position, and the plurality of users can check the image. Then, the plurality of users can write something on or near the image and conduct a discussion. FIG. 7C illustrates an example of a screen in inserting an image in a rectangle 709 surrounded by a dotted line at a center left of the display view 704.

Figure 8:
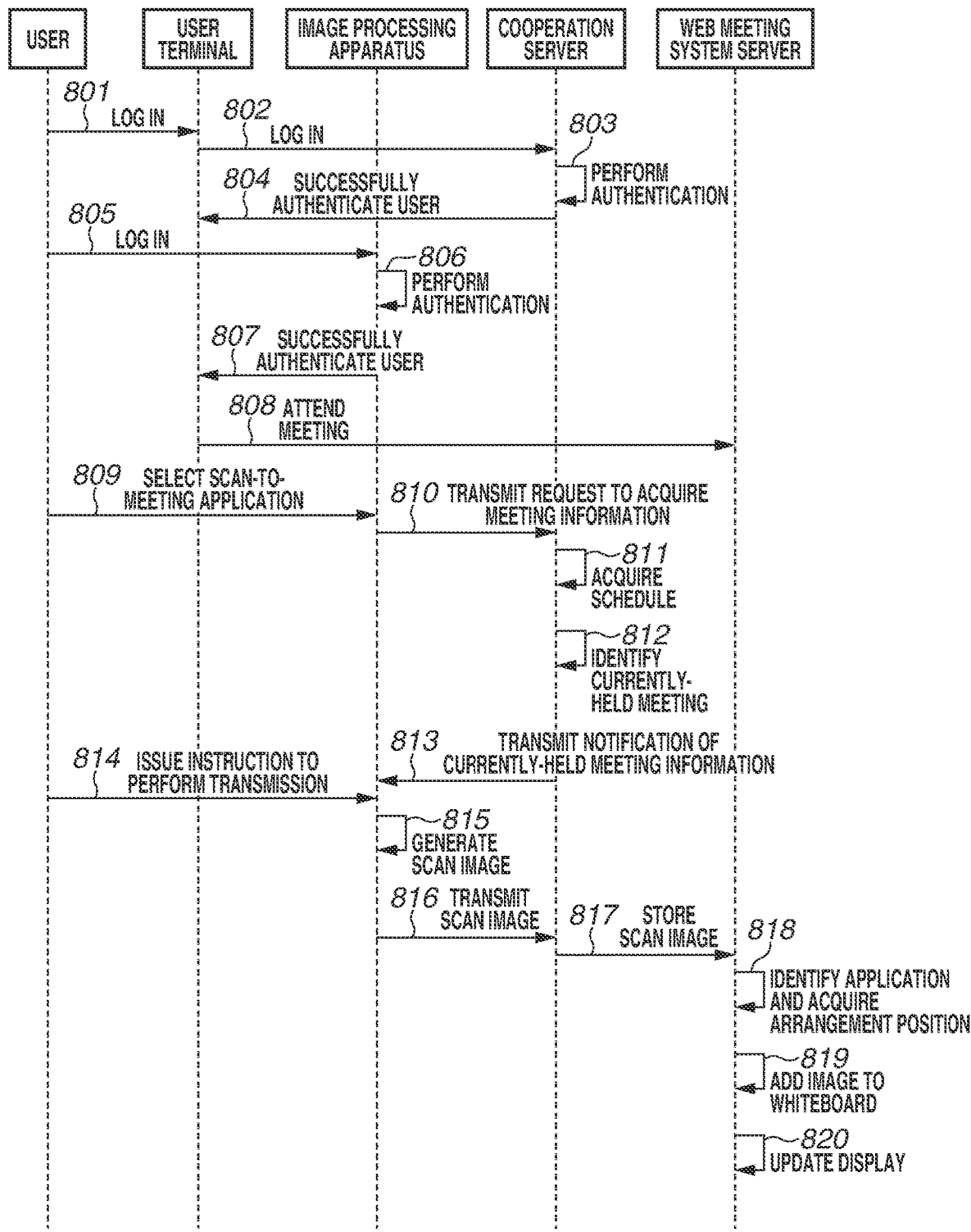
FIG. 8 is a sequence diagram illustrating an example of a process of a scan-to-whiteboard function.

FIG. 8 is a sequence diagram illustrating an example of a process of a scan-to-whiteboard function. Specifically, FIG. 8 is a sequence in a case where a user logs into the cooperation server 102 from the user terminal 103, attends a web meeting provided by the web meeting system server 104, scans, for example, a handwritten note using the image processing apparatus 101, and shares the scanned handwritten note in the web meeting.

In step S801, the user logs into the user terminal 103. Next, in step S802, the user logs into a cooperation service operating on the cooperation server 102 via the cooperation service login application operating on the user terminal 103. At this time, the user can log into the cooperation server 102 in synchronization with the login to the user terminal 103. Specifically, authentication information and a login request that are received from the user are transmitted from the CPU 401 of the user terminal 103 to the cooperation server 102 via the communication unit I/F 407.

In step S803, the CPU 501 of the cooperation server 102 performs authentication processing on the user corresponding to the received login request. In a case where the authentication information is valid, in step S804, the CPU 501 receives the login request. Consequently, the cooperation server 102 stores information "currently logged-in" as account information about the logged-in user.

Next, in step S805, the user inputs the authentication information and logs into the image processing apparatus 101.

In step S806, the CPU 201 of the image processing apparatus 101 performs authentication processing using the input authentication information. In step S807, the CPU 201 receives a login request. At this time, the image processing apparatus 101 has logged into the cooperation server 102.

In step S808, the user operates the user terminal 103 and attends the web meeting provided by the web meeting system server 104. On the web meeting, a sharing application, e.g., the whiteboard application illustrated in FIG. 7B, is operating.

In step S809, in order to share a handwritten note in the meeting that the user currently attends, the user selects a scan-to-meeting application, which will be described below, from application icons displayed on the operation unit 207 of the image processing apparatus 101.

In step S810, the scan-to-meeting application of the image processing apparatus 101 transmits a request to acquire meeting information about the meeting that the logged-in user currently attends to the cooperation server 102. In step S811, the CPU 501 of the cooperation server 102 acquires a schedule of the user from logged-in user information. In step S812, the CPU 501 identifies the currently-held meeting that the user currently attends. The CPU 501 also acquires information that identifies a whiteboard associated with the meeting or a group holding the meeting. While only the information about the meeting that the user currently attends is identified, information about a meeting that has not yet been held or information about a previously-held meeting can also be acquired.

In step S813, the CPU 501 of the cooperation server 102 transmits a notification of the meeting information to the scan-to-meeting application on the image processing apparatus 101. The scan-to-meeting application displays a meeting information list on the operation unit 207 based on the acquired information.

The user selects a desired meeting from the meeting list displayed on the operation unit 207. Then, the user selects a whiteboard corresponding to the selected meeting. A screen via which a whiteboard can be selected directly without selecting a meeting and via which a position to insert image data on the whiteboard application can be selected can be displayed to receive user instructions. Screen examples thereof will be described below.

In step S814, the user selects a meeting and an insertion position and issues an instruction to perform scanning and transmission. In step S815, the image processing apparatus 101 performs scanning. In step S816, the image processing apparatus 101 transmits the generated image data together with transmission destination meeting information to the cooperation server 102. The cooperation server 102 transmits, to the web meeting system server 104, the image data, the meeting information, the information for identifying the whiteboard, the insertion position information, and size information. The meeting information transmitted herein is information about the meeting in which the image data is to be shared and that is selected by the user via the image processing apparatus 101.

The information for identifying the whiteboard can be identification information about the whiteboard or authentication information (identification information) about the user having logged into the image processing apparatus 101 and having issued the image insertion instruction.

In a case where the information for identifying the whiteboard is identification information about the whiteboard, the identification information can be input by the user via the operation unit 207 of the image processing apparatus 101. The information for identifying the whiteboard can be information selected by the user from information received from the cooperation server 102 or the web meeting system server 104.

The insertion position information is information indicating an insertion target position of an image of the image data on the whiteboard and is position information indicating the position designated by the user via the operation unit 207 of the image processing apparatus 101. The size information is information indicating the size of the image to be inserted on the whiteboard and indicates the size set by the user via the operation unit 207 of the image processing apparatus 101.

In step S818, the web meeting system server 104 identifies the whiteboard application on which the image is to be inserted based on the meeting information and the application information. Then, in step S819, the web meeting system server 104 inserts the image of the size specified by the size information at the position specified by the insertion position information. In step S820, the web meeting system server 104 updates the display. Consequently, the image generated by scanning is inserted on the whiteboard provided by the whiteboard application of the meeting designated by the user, and the plurality of users attending the web meeting can share the image.

In a case where the present disclosure is not implemented, typically, a user obtains a scanned image in the user terminal 103 and selects an image insertion menu of the whiteboard application as illustrated in FIG. 7C to share the scanned image.

Figure 9:
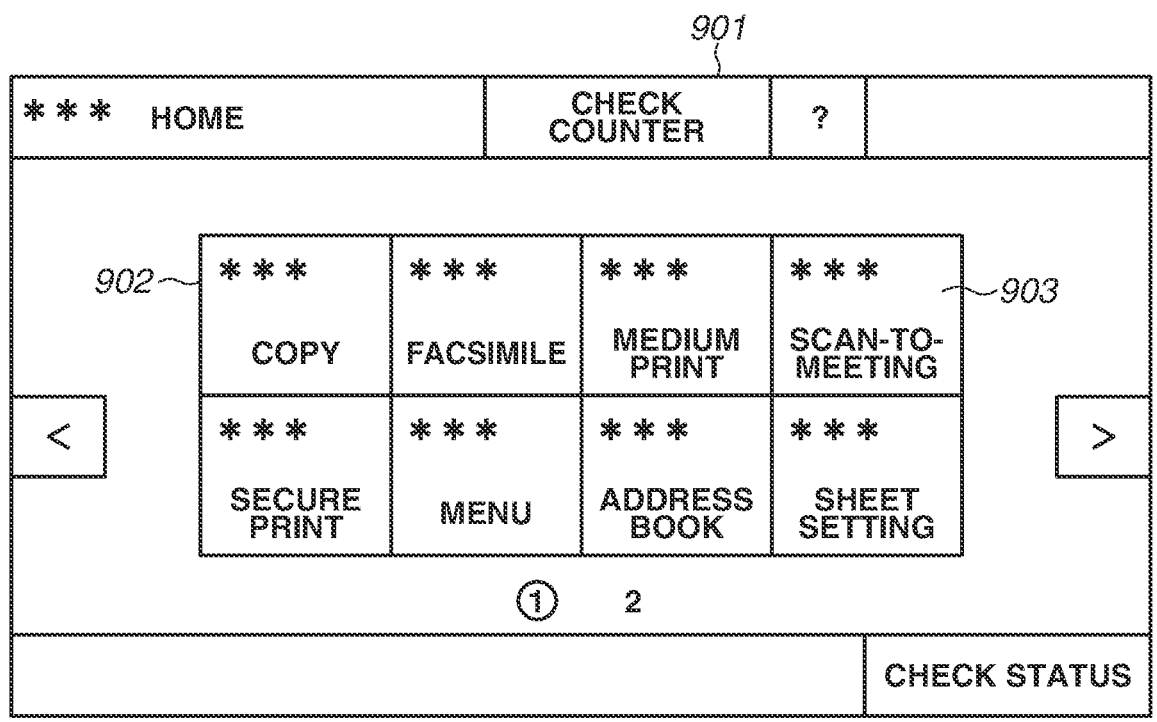
FIG. 9 is a diagram illustrating an example of a screen that is displayed on an operation unit of the image processing apparatus.

FIG. 9 is a diagram illustrating an example of a screen that is displayed on the operation unit 207 of the image processing apparatus 101.

On a home screen 901, icons for executing the functions provided by the image processing apparatus 101 are arranged. For example, in a case where a copy icon 902 is selected, the home screen 901 changes to a copy setting screen (not illustrated) for configuring various settings for performing copying. A scan-to-meeting application icon 903 described above is arranged similarly to the copy icon 902.

FIGS. 10A and 10B are diagrams illustrating an example of a setting screen of the scan-to-meeting application.

In a case where the scan-to-meeting application icon 903 in FIG. 9 is selected, a transmission destination setting screen 1001 as illustrated in FIG. 10A is displayed. The transmission destination setting screen 1001 displays the meeting that the user currently attends, which is acquired from the cooperation server 102 by the image processing apparatus 101. In a case where a checkbox of a listed transmission destination meeting is selected and then an execute-transmission button 1002 is selected, a document is scanned and image data generated by scanning is transmitted. In a case where a meeting name is selected instead of the checkbox, an insertion position selection screen 1003 illustrated in FIG. 10B is displayed. For example, in a case where "Automatic" in FIG. 10B is selected, a portion without an object on the whiteboard is automatically selected. Display position selection items can be preset or can be acquired from the cooperation server 102. After a display position is selected, the transmission destination setting screen 1001 is displayed again, and in a case where the execute-transmission button 1002 is selected, the image processing apparatus 101 performs scanning and transmits image data to the cooperation server 102. A scan setting screen (not illustrated) can be displayed on the operation unit 207 before the transmission destination setting screen 1001 is displayed.

On the scan setting screen, settings for generating image data to be inserted on the whiteboard can be configured. For example, a color setting, a file format, a reading size, and a one-sided/two-sided setting can be received from the user via the operation unit 207.

In a case where a plurality of document pages is read based on a scan instruction, image data is generated for each page, and then the plurality of pieces of image data is transmitted to the web meeting system server 104 via the cooperation server 102. Then, the plurality of images can be inserted on the whiteboard. In a case where the images of the plurality of pieces of image data are to be inserted on the whiteboard, an image insertion target position is designated for each piece of image data via the operation unit 207.

Alternatively, a plurality of document pages can be read, and all the read document pages can be arranged in an N-in-1 layout in a single image. Then, the single piece of image data can be inserted on the whiteboard. In a case where a plurality of document pages is read, a screen for prompting the user to select whether the plurality of images is to be inserted or the plurality of images is to be combined together and the resulting single image is to be inserted can be displayed on the operation unit 207 to receive selection from the user.

Figure 11:
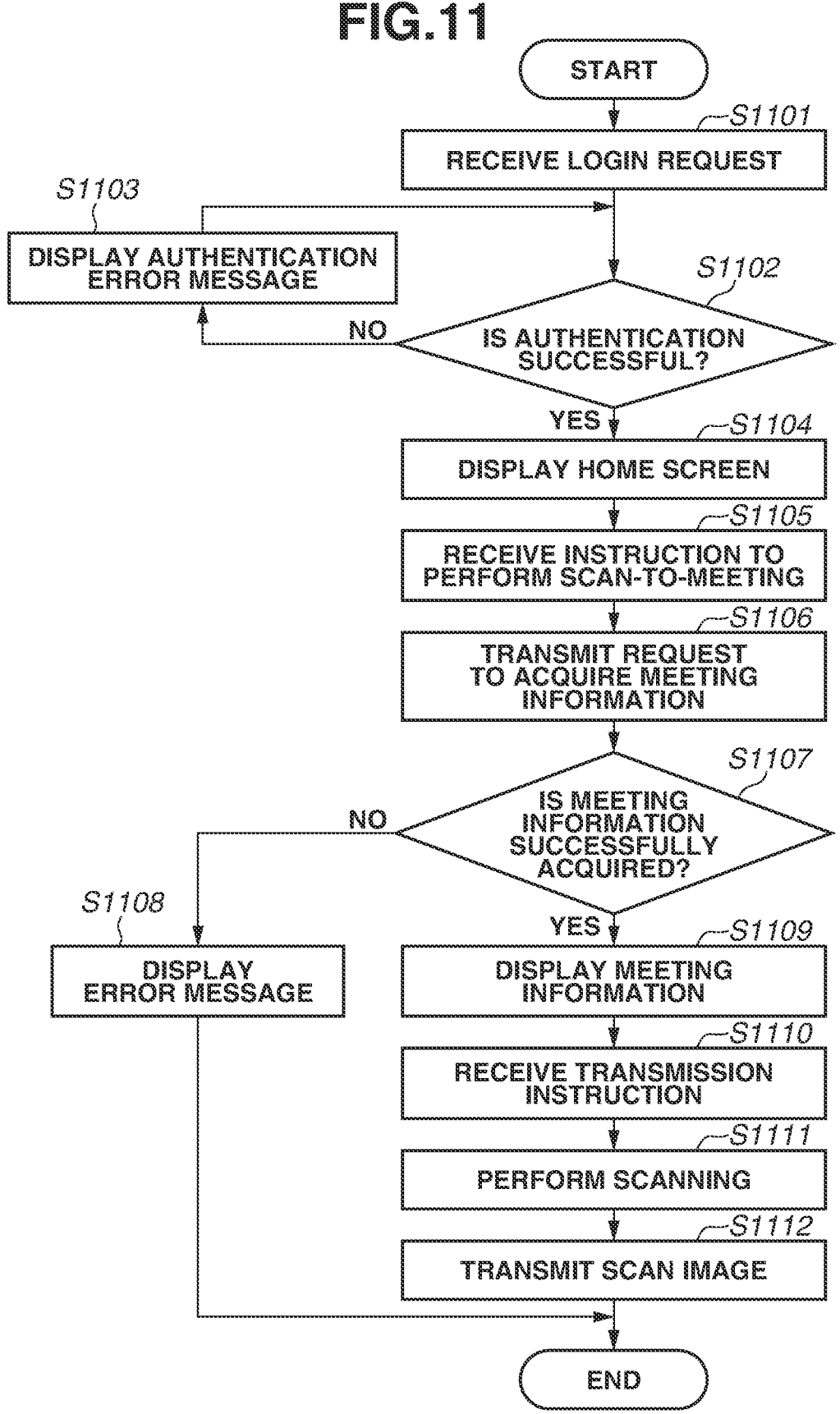
FIG. 11 is a flowchart illustrating an example of a process of the image processing apparatus during performance of the sequence illustrated in FIG. 8.

FIG. 11 is a flowchart illustrating an example of a process of the image processing apparatus 101 during performance of the sequence illustrated in FIG. 8. The flowchart in FIG. 11 is performed by the CPU 201 of the image processing apparatus 101 by extracting a program stored in the ROM 202 or the storage 204 to the RAM 203 and executing the program. The process flow in FIG. 11 is started when the image processing apparatus 101 is turned on.

In step S1101, the image processing apparatus 101 receives a login request from the user. In step S1102, the image processing apparatus 101 performs authentication processing. In a case where the authentication is unsuccessful (NO in step S1102), in step S1103, the image processing apparatus 101 displays an error message to prompt the user to re-input authentication information. In a case where the authentication is successful (YES in step S1102), in step S1104, the image processing apparatus 101 displays the home screen 901. In step S1105, the user places a document on the reading unit 209 of the image processing apparatus 101 and selects the scan-to-meeting application icon 903. In step S1106, the scan-to-meeting application operating on the image processing apparatus 101 transmits a request to acquire meeting information about the logged-in user to the cooperation server 102. In step S1107, in a case where a notification of unsuccessful acquisition of meeting information is received from the cooperation server 102 (NO in step S1107), in step S1108, the image processing apparatus 101 displays an error message. In a case where meeting information is successfully acquired (YES in step S1107), in step S1109, the image processing apparatus 101 displays the acquired meeting information on the transmission destination setting screen 1001. In step S1110, the user selects a display position and selects the execute-transmission button 1002. In step S1111, the image processing apparatus 101 performs scanning. In step S1112, the image processing apparatus 101 transmits the image data together with the meeting information, the position information, and the size information to the cooperation server 102.

Figure 12:
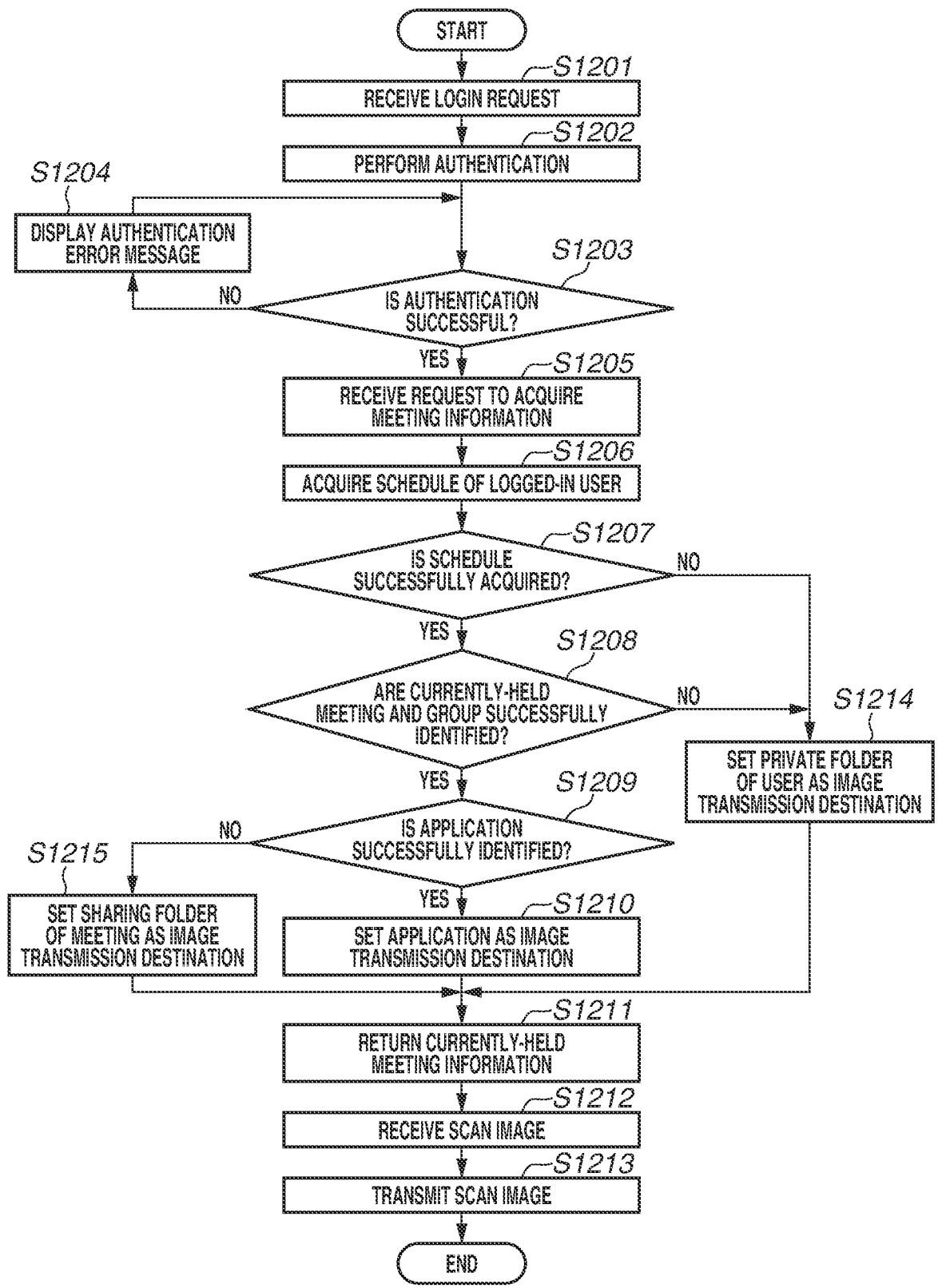
FIG. 12 is a flowchart illustrating an example of a process of the cooperation server during performance of the sequence illustrated in FIG. 8.

FIG. 12 is a flowchart illustrating an example of a process of the cooperation server 102 during performance of the sequence illustrated in FIG. 8. The flowchart in FIG. 12 is performed by the CPU 501 of the cooperation server 102 by extracting a program stored in the ROM 502 or the HDD 504 to the RAM 503 and executing the program. The process flow in FIG. 12 is started when the cooperation server 102 is turned on.

In step S1201, the cooperation server 102 receives a login request from the user terminal 103.

In step S1202, the cooperation server 102 performs authentication processing. In a case where the authentication is unsuccessful (NO in step S1203), in step S1204, the cooperation server 102 displays an error message to prompt the user to re-input authentication information. After the authentication is successfully performed (YES in step S1203), in step S1205, the cooperation server 102 receives user information and a meeting information acquisition request from the image processing apparatus 101. In step S1206, the cooperation server 102 acquires a schedule of the user from the user information. In a case where the schedule is successfully acquired (YES in step S1207), in step S1208, the cooperation server 102 identifies a meeting that is currently held and a group of the held meeting. In a case where the meeting and the group are successfully identified (YES in step S1208), in step S1209, the cooperation server 102 identifies a sharing application associated with the meeting or the group.

In a case where the application is successfully identified (YES in step S1209), in step S1210, the cooperation server 102 sets application information associated with the currently-held meeting as an image transmission destination in currently-held meeting information. In step S1211, the cooperation server 102 transmits a notification of the currently-held meeting information to the image processing apparatus 101. In step S1212, the cooperation server 102 receives the scan image and the transmission destination meeting information from the image processing apparatus 101. In step S1213, the cooperation server 102 transmits the scan image and the meeting information to the web meeting system server 104.

In a case where the schedule acquisition is unsuccessful (NO in step S1207), or in a case where the currently-held meeting and the group of the held meeting are unsuccessfully identified (NO in step S1208), in step S1214, the cooperation server 102 sets a private folder of the logged-in user as an image transmission destination. In a case where the application is unsuccessfully identified (NO in step S1209), in step S1215, the cooperation server 102 sets a sharing folder of the currently-held meeting as an image transmission destination. A folder to be set can be set via a setting screen (not illustrated), or in a case of an acquisition failure, an error screen can be displayed and the process can end.

Figure 13:
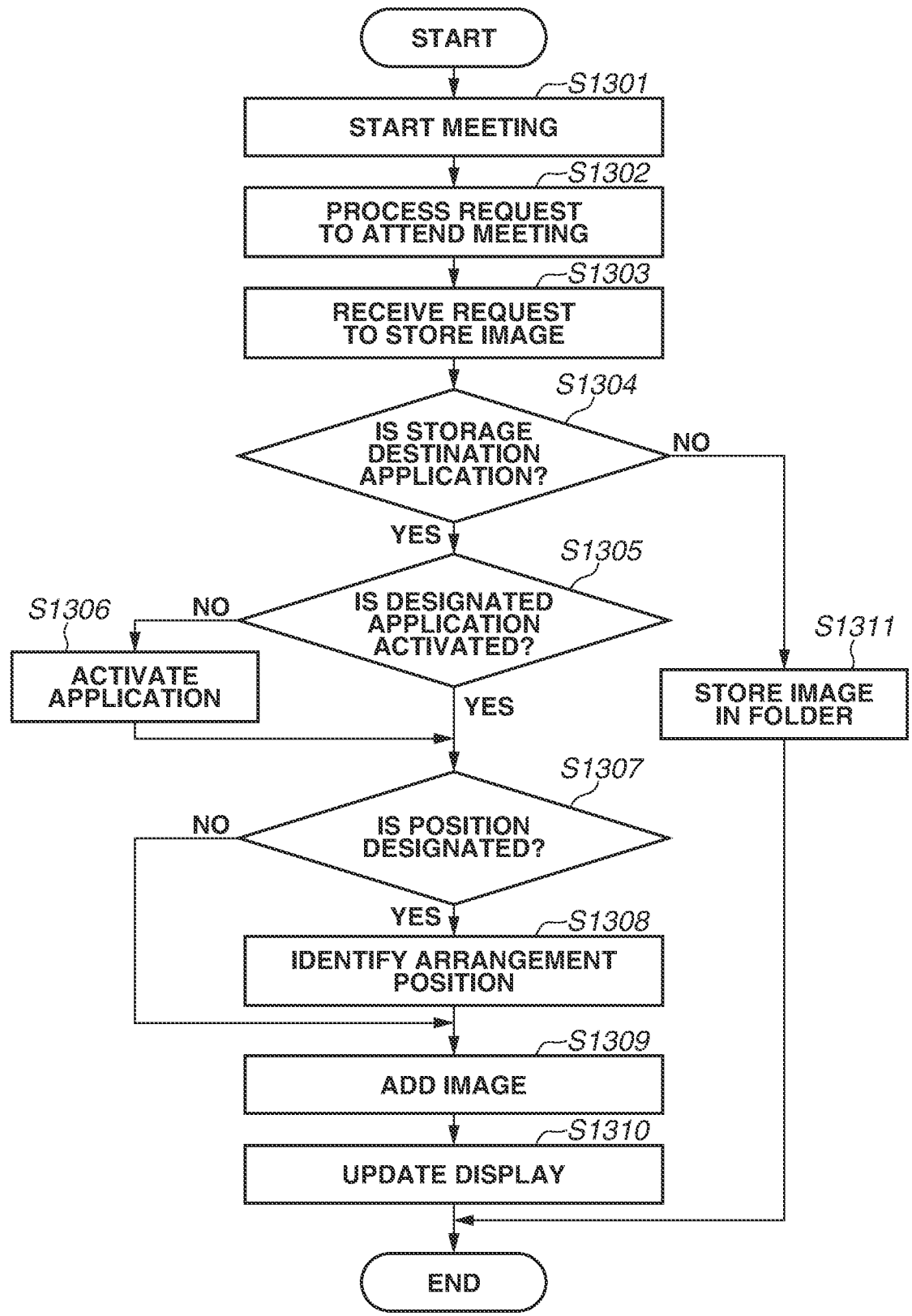
FIG. 13 is a flowchart illustrating an example of a process of the web meeting system server during performance of the sequence illustrated in FIG. 8.

FIG. 13 is a flowchart illustrating an example of a process of the web meeting system server 104 during performance of the sequence illustrated in FIG. 8. The flowchart in FIG. 13 is performed by the CPU 601 of the web meeting system server 104 by extracting a program stored in the ROM 602 or the HDD 604 to the RAM 603 and executing the program. The process flow in FIG. 13 is started when a web meeting start request is received.

In step S1301, the web meeting system server 104 starts a web meeting. Then, in step S1302, the web meeting system server 104 processes a request to attend the web meeting from each attendee user. In step S1303, the web meeting system server 104 receives, from the cooperation server 102, a request to store image data transmitted from the scan-to-meeting application. In a case where an application is set as image transmission destination information included in the meeting information received together with the image data (YES in step S1304), in step S1305, the web meeting system server 104 checks whether the designated application is activated. In a case where the application is not activated (NO in step S1305), in step S1306, the web meeting system server 104 activates the application. In a case where the application is or has been activated (YES in step S1305), in step S1307, the web meeting system server 104 checks whether the meeting information transmitted from the cooperation server 102 includes insertion position information. In a case where a position is designated (YES in step S1307), in step S1308, the web meeting system server 104 identifies the designated position. In a case where no position is designated (NO in step S1307), in step S1309, the web meeting system server 104 adds the image to a predetermined position. In step S1310, the web meeting system server 104 updates the display.

In a case where the storage destination is a folder (NO in step S1304), in step S1311, the web meeting system server 104 stores the image in the designated folder.

While image data and meeting information are transmitted to the web meeting system server 104 via the cooperation server 102 in the above-described example according to the present exemplary embodiment, the present exemplary embodiment is not limited to the example. For example, the image processing apparatus 101 can communicate directly with the web meeting system server 104 without using the cooperation server 102. In this case, the image processing apparatus 101 receives meeting information from the web meeting system server 104 and transmits image data, meeting information, insertion position information, and size information directly to the web meeting system server 104.

While a whiteboard on which an image is to be inserted and a meeting corresponding to the whiteboard are selected using the image processing apparatus 101 in the above-described example according to the present exemplary embodiment, the present exemplary embodiment is not limited to the example. For example, the image processing apparatus 101 only receives a scan setting and transmits image data generated by scanning based on the scan setting to the cooperation server 102, and the cooperation server 102 receives selection of a whiteboard on which an image is to be inserted and selection of a meeting. Specifically, a whiteboard, a meeting, an image insertion position, and a size can be selectable via a screen displayed on the user terminal 103 connected to the cooperation server 102.

A second exemplary embodiment will now be described. Differences from the first exemplary embodiment will be described below, and redundant descriptions are omitted. A form of transmitting image data generated by scanning to a display apparatus such as a display and displaying an image instead of sharing the image on a web meeting according to the present exemplary embodiment will be described below.

Figure 14:
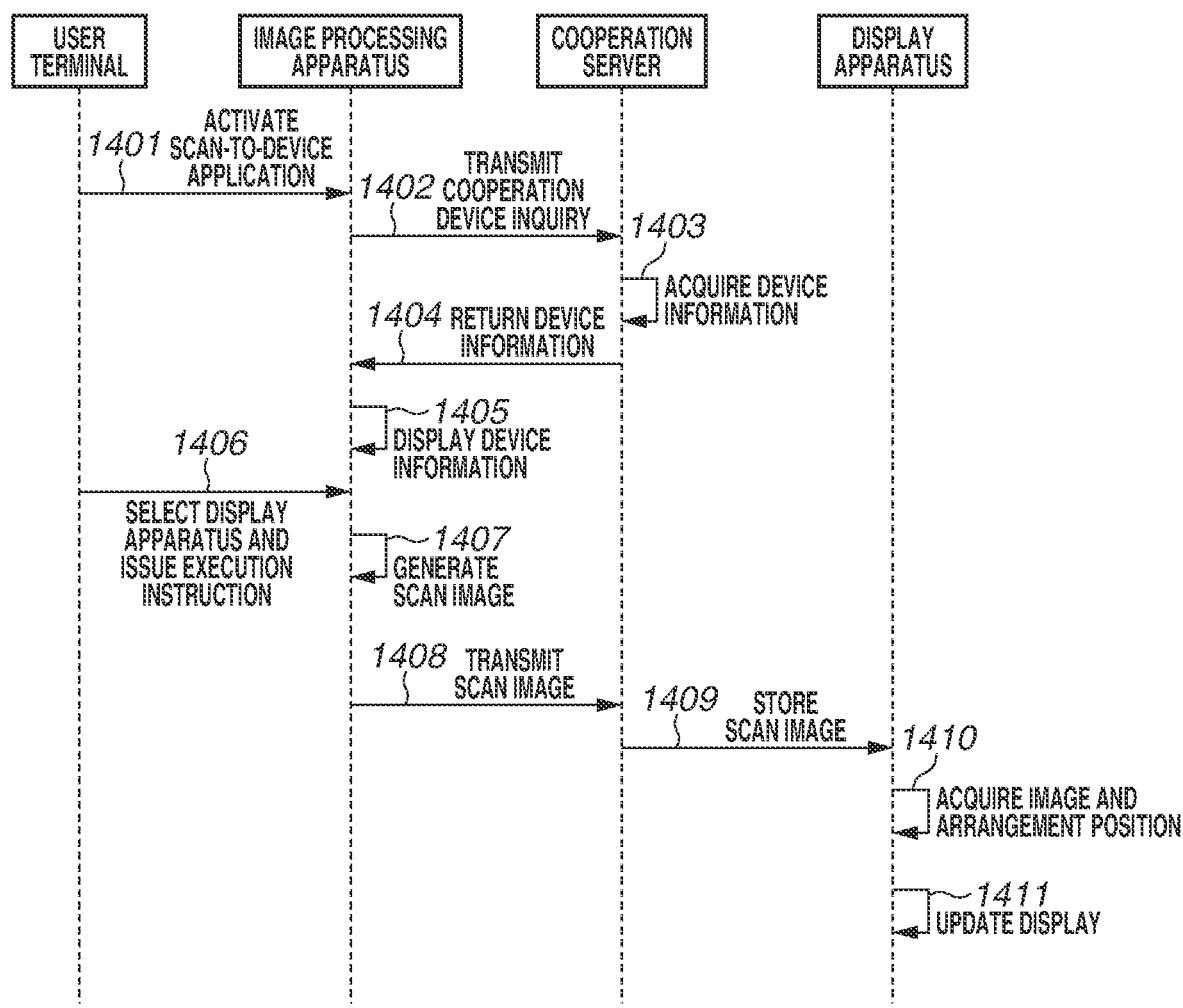
FIG. 14 is a diagram illustrating an example of a sequence in displaying an image of image data generated by scanning on a display apparatus.

FIG. 14 is a diagram illustrating an example of a sequence of displaying an image of image data generated by scanning on the display apparatus 105. The user has logged into the cooperation server 102 and the image processing apparatus 101. In step S1401, the user activates a scan-to-device application (not illustrated). In step S1402, the image processing apparatus 101 transmits a cooperation device inquiry to the cooperation server 102. In step S1403, the cooperation server 102 acquires device information registered in the cooperation server 102. In step S1404, the cooperation server 102 transmits a notification of the device information to the image processing apparatus 101. In step S1405, the image processing apparatus 101 displays the acquired device information on the operation unit 207. A display position can be selectable as in the first exemplary embodiment. In step S1406, the user selects the display apparatus 105 and issues a transmission execution instruction. In step S1407, the image processing apparatus 101 performs scanning. In step S1408, the image processing apparatus 101 transmits a scan image and the display apparatus 105 selected as display destination information to the cooperation server 102. In step S1409, the cooperation server 102 transmits image data and position information to the display apparatus 105, and the display apparatus 105 stores the received image data in a storage. In step S1410, the display apparatus 105 acquires the scan image and, in a case where there is display position information, arranges the scan image based on what the display position information designates. In step S1411, the display apparatus 105 updates the display.

A third exemplary embodiment will now be described. Differences from the first exemplary embodiment will be described below, and redundant descriptions are omitted. According to the first exemplary embodiment, a scan image is transmitted to a currently-held web meeting. According to the third exemplary embodiment, image data is registered in association with a web meeting to be held.

FIG. 15 is a diagram illustrating an example of a transmission destination screen 1501 displayed in a case where the scan-to-meeting application icon 903 is selected. The scan-to-meeting application transmits a request for a future meeting schedule of the logged-in user to the cooperation server 102. The cooperation server 102 acquires, for example, a current-week meeting schedule of the logged-in user and transmits the acquired schedule to the image processing apparatus 101. The scan-to-meeting application displays the acquired meeting information on the transmission destination screen 1501. In a case where the user selects a meeting in which an image is to be registered and then presses a transmission execution button 1502, the selected meeting information and the scan image are transmitted to the cooperation server 102. The cooperation server 102 transmits the meeting information and the scan image to the web meeting system server 104, and the web meeting system server 104 associates the scan image as a material for the designated meeting.

Figure 16:
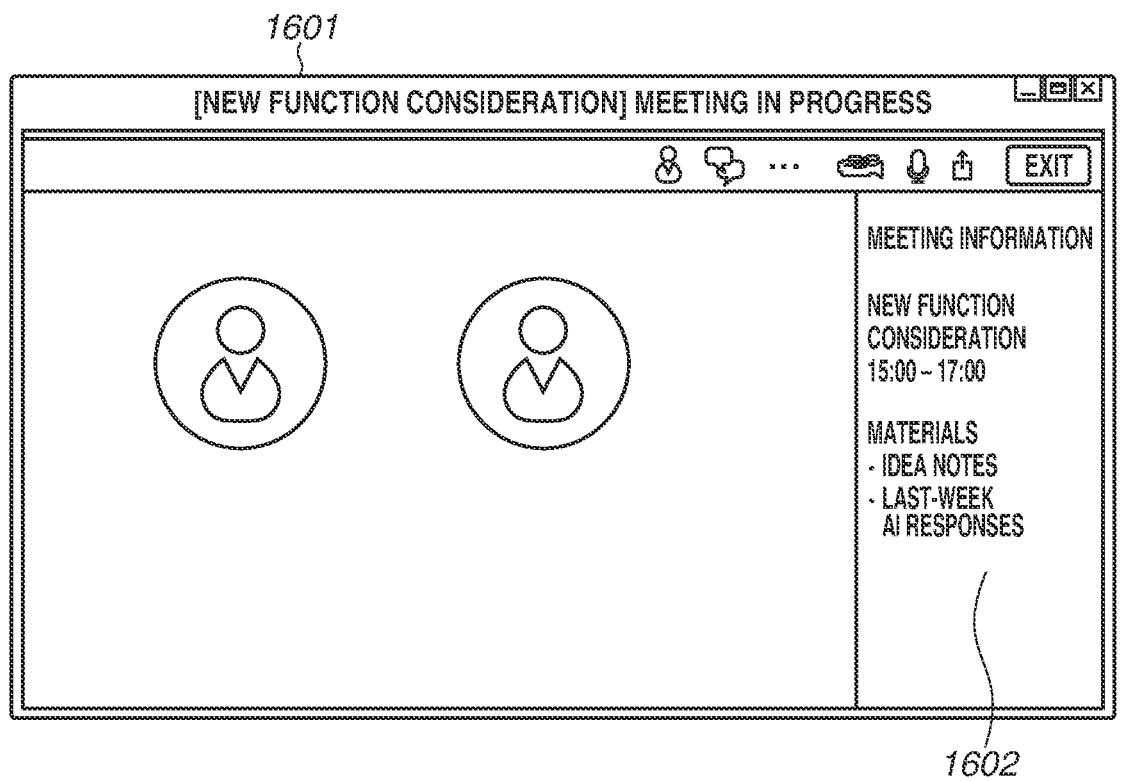
FIG. 16 is a diagram illustrating an example of a screen of the web meeting application in a case where a meeting in which a scan image is registered in advance by the scan-to-meeting application is held.

FIG. 16 is a diagram illustrating an example of a screen of a web meeting application in a case where a meeting in which a scan image is registered in advance by the scan-to-meeting application is stored.

A meeting information view 1602 on a web meeting application 1601 displays meeting information and links to registered materials. In a case where a scan image is transmitted by the scan-to-meeting application, the scan image is registered in advance as a meeting material.

A scan image can be added to a meeting to be held as well as added to minutes of a previously-held meeting by selecting the previously-held meeting.

As described above, in sharing a handwritten material in a web meeting, the material is shared and inserted with ease especially in inserting the material on a sharing application such as a whiteboard application.

Other Exemplary Embodiments

The present disclosure can also be realized by the following processing. Specifically, a program for implementing one or more functions of the above-described exemplary embodiments is supplied to a system or an apparatus via a network or a storage medium. Then, one or more processors of a computer of the system or the apparatus reads the program and executes the read program. The present invention can also be realized by a circuit (e.g., ASIC) that realizes the one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While exemplary embodiments have been described, these embodiments are not seen to be limiting. The scope of the following claims is to be accorded the broadest interpretation so as to encompass all such modifications and equivalent structures and functions.

This application claims the benefit of Japanese Patent Application No. 2022-012594, filed Jan. 31, 2022, which is hereby incorporated by reference herein in its entirety.

What is claimed is:

1. An image processing apparatus comprising:
a scanner that scans an image of a document and generates image data;
a controller that
receives information for identifying an online meeting that provides a whiteboard function,
receives a selection corresponding to an online meeting based on the received information,
an operation panel that receives, before the generated image data is transmitted to an online meeting server hosting the selected online meeting, a selection corresponding to position information representing at least one predetermined position from among a plurality of predetermined positions on a whiteboard provided by the whiteboard function of the online meeting in which the generated image data is to be displayed; and
a communicator that transmits to the online meeting server hosting the selected online meeting, the generated image data and the selected position information,
wherein the controller is further configured to
determine a meeting status for an online meeting corresponding to the received information; and
in response to the determined meeting status indicating the online meeting is to be held, register, as meeting materials, the generated image data and the selected position information with the received information for identifying the online meeting and cause the communicator to transmit the registered meeting materials to the online meeting server, and
in response to the determined meeting status indicating that the online meeting is currently being held, cause the communicator to transmit the generated image data and the selected position information to the online meeting server.

2. The image processing apparatus according to claim 1, wherein the received information for identifying the online meeting includes identification information about the whiteboard provided by the whiteboard function of the online meeting.

3. The image processing apparatus according to claim 1, wherein the received information includes identification information corresponding to a user logged into the image processing apparatus having the scanner.

4. The image processing apparatus according to claim 1, further comprising a conveyor that conveys the document, wherein the scanner scans the document conveyed by the conveyor.

5. The image processing apparatus according to claim 4, wherein the conveyor conveys a plurality of documents, and the scanner scans the plurality of conveyed documents and generates a plurality of pieces of image data, and
wherein the communicator transmits the plurality of generated pieces of image data and the received information to the online meeting server.

6. The image processing apparatus according to claim 5, wherein the controller receives designation of an image insertion position for each of the plurality of pieces of image data.

7. The image processing apparatus according to claim 1, wherein the controller receives a scan setting from a user, and
wherein the scanner scans the document based on the received scan setting.

8. A non-transitory computer-readable storage medium storing a program for causing a computer to execute a method for image processing, the method comprising:
scanning an image of a document and generating image data;
receiving information for identifying an online meeting that provides a whiteboard function,
receiving selection corresponding to an online meeting based on the received information;
receiving, before the generated image data is transmitted to an online meeting server hosting the selected online meeting, a selection corresponding to position information representing at least one predetermined position from among a plurality of predetermined positions on a whiteboard provided by the whiteboard function of the online meeting in which the generated image data is to be displayed;
transmitting, to the online meeting server hosting the selected online meeting, the generated image data and the selected position information
determining a meeting status for an online meeting corresponding to the received information;
in response to the determined meeting status indicating the online meeting is to be held, registering, as meeting materials, the generated image data and the selected position information with the received information for identifying the online meeting and causing the communicator to transmit the registered meeting materials to the online meeting server; and in response to the determined meeting status indicating that the online meeting is currently being held, causing the communicator to transmit the generated image data and the selected position information to the online meeting server.

9. An image processing system comprising:

a scanner that scans an image of a document and generates image data;

a controller that receives information for identifying an online meeting that provides a whiteboard function, receives a selection corresponding to an online meeting based on the received information, and an operation panel that receives, before the generated image data is transmitted to an online meeting server hosting the selected online meeting, a selection corresponding to position information representing at least one predetermined position from among a plurality of predetermined positions on a whiteboard provided by the whiteboard function of the online meeting in which the generated image data is to be displayed; and a communicator that transmits to the online meeting server hosting the selected online meeting, the generated image data and the selected position information, wherein the generated image data is caused to be displayed at a position on the whiteboard corresponding to the selected position information wherein the controller is further configured to determine a meeting status for an online meeting corresponding to the received information; and in response to the determined meeting status indicating the online meeting is to be held, register, as meeting materials, the generated image data and the selected position information with the received information for identifying the online meeting and cause the communicator to transmit the registered meeting materials to the online meeting server, and in response to the determined meeting status indicating that the online meeting is currently being held, cause the communicator to transmit the generated image data and the selected position information to the online meeting server.

10. The image processing system according to claim 9, wherein the received information for identifying the online meeting includes identification information about the whiteboard provided by the whiteboard function of the online meeting.

11. The image processing system according to claim 9, wherein the received information includes identification information corresponding to a user logged into an image processing apparatus having the scanner.

12. The image processing system according to claim 9, further comprising a conveyor that conveys the document, wherein the scanner scans the document conveyed by the conveyor.

13. The image processing system according to claim 12, wherein the conveyor conveys a plurality of documents, and the scanner scans the plurality of conveyed documents and generates a plurality of pieces of image data, and wherein the communicator transmits the plurality of generated pieces of image data and the received information to the online meeting server.

14. The image processing system according to claim 13, wherein the controller receives designation of an image insertion position for each of the plurality of pieces of image data.

15. The image processing system according to claim 9, wherein the online meeting server receives the generated image data and the received information, and wherein the online meeting server inserts the image of the received image data on the whiteboard based on the received information and the received image data.

16. The image processing system according to claim 9, wherein the controller receives a scan setting from a user, and wherein the scanner scans the document based on the received scan setting.

17. The image processing system according to claim 9, wherein the whiteboard is displayed on a display of a terminal apparatus connected to the online meeting server.

18. The image processing system according to claim 17, wherein a user draws an object on the whiteboard via a user interface displayed on the display of the terminal apparatus using the whiteboard function.

19. The image processing system according to claim 9, wherein the whiteboard function is a function of substantially simultaneously sharing inserted information with a plurality of users each operating one of a plurality of terminal apparatuses connected to the online meeting server.

* * * * *